A. BOUAS.
MOTOR VEHICLE.
APPLICATION FILED AUG. 20, 1912.
1,066,072.
Patented July 1, 1913.
3 SHEETS—SHEET 1.
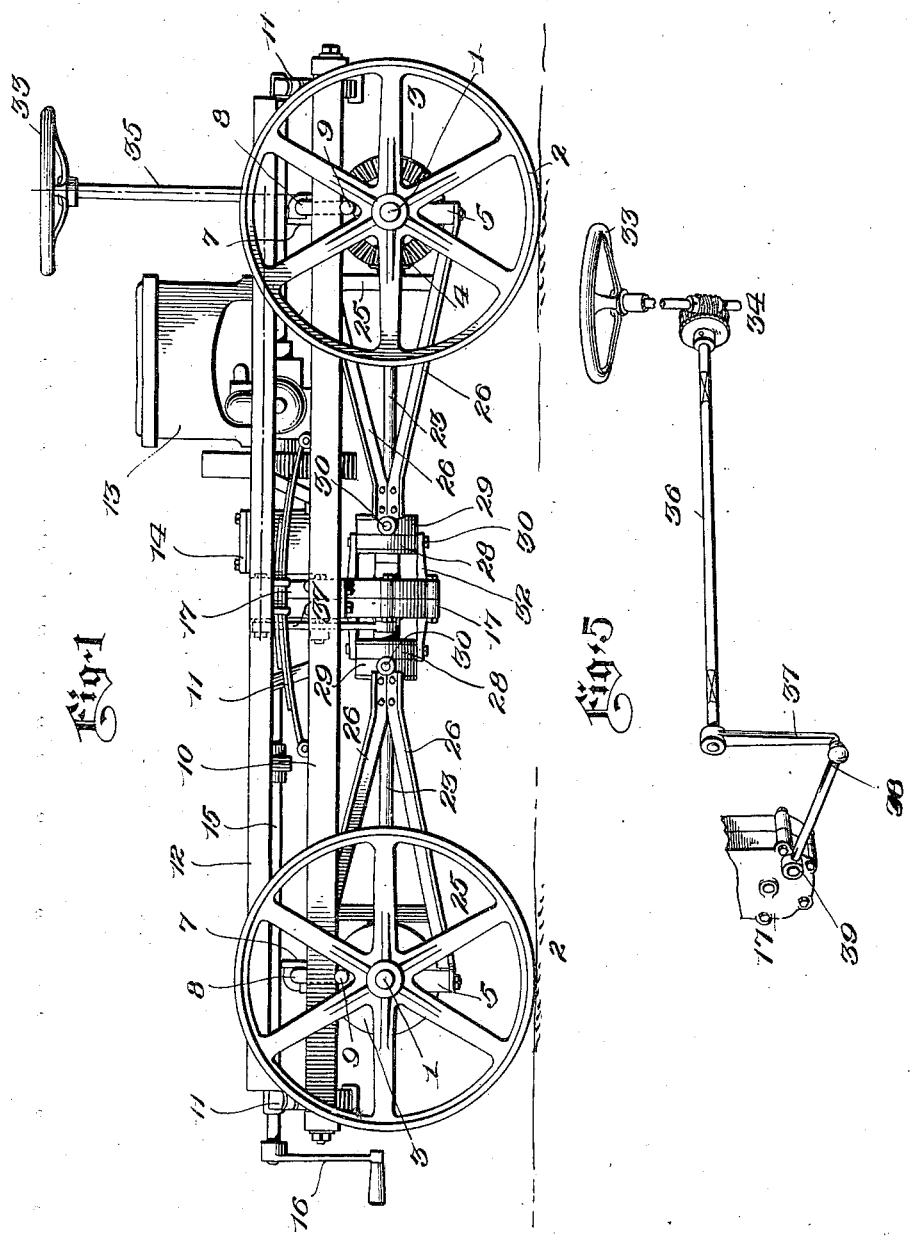
Witnesses
Inventor
Alphons Bouas,
By
Attorneys.

A. BOUAS.
MOTOR VEHICLE.
APPLICATION FILED AUG. 20, 1912.
1,066,072.
Patented July 1, 1913.
3 SHEETS—SHEET 2.
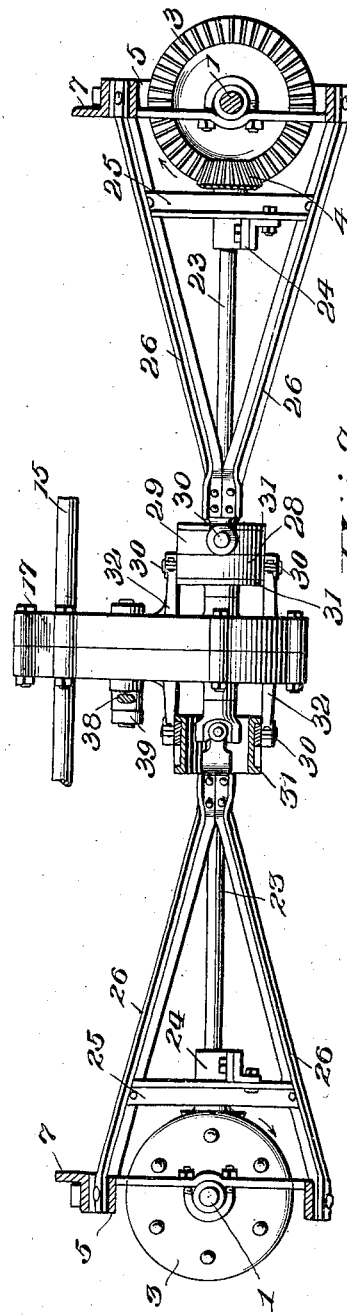
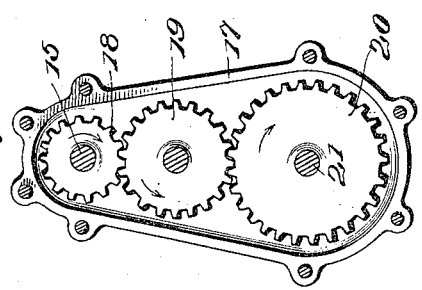
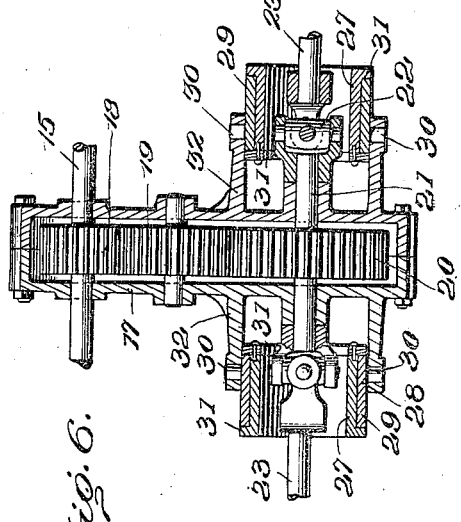
Inventor
Alphons Bouas.
By [signature], Attorneys.
Witnesses
[signatures]

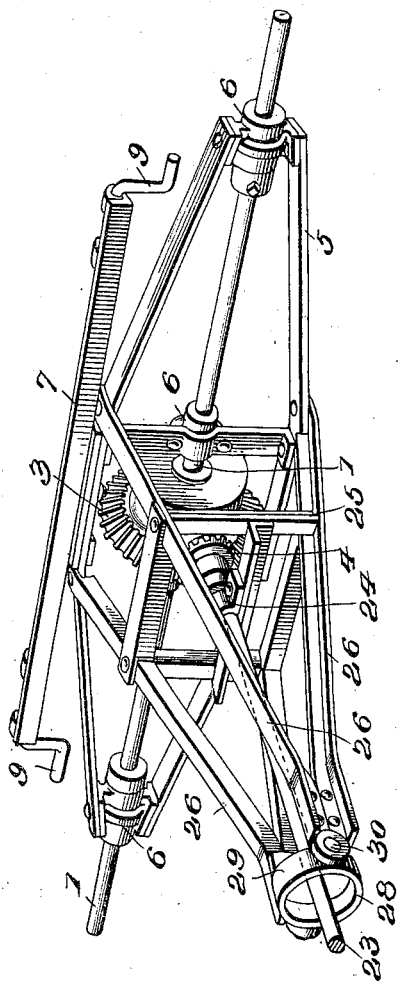

UNITED STATES PATENT OFFICE.

ALPHONS BOUAS, OF COULTERVILLE, ILLINOIS.

MOTOR-VEHICLE.

1,066,072.  Specification of Letters Patent.  Patented July 1, 1913.

Application filed August 20, 1912. Serial No. 716,091.

*To all whom it may concern:*

Be it known that I, ALPHONS BOUAS, a citizen of the United States, residing at Coulterville, in the county of Randolph and State of Illinois, have invented certain new and useful Improvements in Motor-Vehicles, of which the following is a specification.

This invention relates to the means for propelling and steering motor vehicles, and has for its object the provision of means whereby the power will be applied equally to both axles and whereby both axles may be adjusted at an angle to the central longitudinal line of the vehicle in order to cause the same to turn corners or round curves.

The invention also seeks to simplify the construction and arrangement of the propelling mechanism of a motor vehicle to the end that the durability and efficiency of the same may be increased.

The invention is fully illustrated in the accompanying drawings and will be hereinafter first fully described and then more particularly pointed out in the appended claims.

In the drawings:—Figure 1 is a side elevation of a portion of a motor vehicle equipped with my invention; Fig. 2 is a side elevation, partly in section, of the parts more directly included in my improvements; Fig. 3 is a perspective view of one of the axles with the hounds and other parts connected therewith; Fig. 4 is a detail perspective view of the frame; Fig. 5 is a detail perspective view of the steering wheel and the parts immediately actuated thereby; Fig. 6 is an enlarged vertical longitudinal section through the suspended gear case; Fig. 7 is a transverse section of the same; Fig. 8 is a detail view showing the members of the outer universal coupling separated and in their proper relative positions; Fig. 9 is a detail perspective view of the hanger by which the body supporting frame is mounted on the axle frames.

In carrying out my invention, I employ front and rear axles 1 which are of the usual form and are equipped with ground wheels 2 and gear wheels 3 in the usual manner, said gear wheels receiving motion from pinions 4 meshing therewith. Axle frames 5 are fitted upon the axles so as to support bearings 6 in which the axles rotate, and upon the said axle frames bolsters 7 are pivotally secured, the heads of the pivots or king bolts appearing at 7' in Fig. 2. At the ends of the said bolsters, I journal hangers 8 which are provided with crank arms 9 beyond the ends of the bolsters, said crank arms depending from the bolsters and having pivotal connections with the outer lower frame 10, as shown. Springs 11 are secured to the said frame 10, and upon the said springs, I secure the upper frame 12 which supports the engine, indicated conventionally at 13, and the transmission gearing 14 which is driven directly by the engine and which may be of any preferred type whereby the speed and direction of travel of the vehicle may be controlled. The engine shaft 15 is also journaled upon the said upper frame 12 and may be equipped at one end with a starting crank 16 of the usual form. The engine shaft 15 is preferably constructed in two sections connected by the transmission gearing, indicated conventionally at 14, and upon the rear section of the shaft is pivotally hung a gear case 17 adapted to swing in a vertical plane about the said shaft as a center. Within the upper end of the said case and fixed upon the shaft is a pinion 18 which meshes with an intermediate pinion 19 carried by a stub-shaft which is journaled in the sides of the case and which in turn meshes with a gear wheel 20 in the lower end of the case and fixed to a short shaft 21 disposed longitudinally of the vehicle and having its front and rear ends connected by gimbal joints 22 to forwardly and rearwardly extending shafts 23 which carry the pinions 4 meshing with the gear wheels 3 on the axles previously mentioned. The outer ends of the shafts 23 are journaled in bearings 24 provided upon frames 25 which are carried by the hounds 26 extending from the axle frames 5 whereby the shafts will be supported so as to hold the pinions 4 constantly in mesh with the gear wheels 3. The hounds 26 are arranged in pairs, one pair being provided at each side of each shaft 23 and having their rear ends secured to the top and bottom of the axle frames 5 and their front ends brought together and connected with the gear case 17 by universal couplings. These couplings are preferably of the construction illustrated in Figs. 6 and 8 and consist of sleeves 27 upon which are loosely fitted a pair of rings 28, 29, each provided at diametrically opposite points with cylindrical lugs or projections 30. The rings 28, 29 are fitted upon the sleeve 27, and retaining collars 31 are secured to the opposite ends of the said sleeve so as to retain the rings in position thereon. The sleeves and the rings fitted thereon are inserted in the ends of tubular projections 32 on the sides of the gear case 17 at the lower end thereof, and the pins 30 on the inner ring 28 are engaged in openings provided therefor in the ends of the said tubular projections, thereby pivotally attaching the ring and sleeve to the gear case. The pins 30 on the ring 29 are pivotally fitted in the front ends of the hounds 26 and are held against detachment therefrom by any preferred means. It will thus be readily seen that the hounds may be rotated about the axis of the sleeve 27 and will also be permitted to move laterally with respect to the gear casing by reason of the pivotal connection between the said casing and the sleeve through the inner ring 28. A steering wheel 33 is provided at the front end of the vehicle and this steering wheel is connected through any convenient gearing, such as a worm gear, illustrated at 34, at the lower end of the steering post 35, with a rock shaft 36 which is mounted upon the upper frame 12. The rear end of this rock shaft 36 is equipped with a crank arm 37 connected by a link 38 with a pin 39 or equivalent device on the gear case 17.

The construction and arrangement of the several parts of the apparatus being thus made known, it is thought the operation and advantages of the same will be readily understood. The power of the engine will be transmitted through the transmission gearing, indicated at 14, to the pinion 18 which in turn will act through the gear wheel 19 to rotate the gear wheel 20 and thereby actuate the shaft 21 and the shafts 23 connected therewith, the said shafts 23 actuating the pinions 4 and gear wheels 3 to rotate the axles and thereby cause the ground wheels 2 to travel in the usual manner. It will be readily noted that the mechanism devised and employed by me positively rotates both axles so that the propelling force is equally distributed at the ends of the vehicle frame and consequently the vehicle will be caused to travel more rapidly and easily than with the mechanism commonly used. As the power is thus evenly distributed, the vehicle may be more readily driven over rough and soft roads.

When it is desired to turn a corner or round a curve, the steering wheel 33 is properly manipulated so as to rock the shaft 36 and thereby, through the crank arm 37 and the link 38, cause the gear case 17 to oscillate about the engine shaft 15 as a center and consequently swing the shaft 21 to one side of the vertical plane of the driving shaft. When the lower end of the gear case 17 and the shaft 21 are thus swung to one side, the lateral movement of the gear case will be imparted directly to the inner ends of the hounds and the movement thus imparted to the hounds will cause the axle frames 5 to swing about the king bolts by which they are pivotally connected to the bolsters 7 so that both axles will be disposed at an angle to the central longitudinal line of the machine and consequently the vehicle will be caused to make a short turn around a sharp curve or corner. The knuckle joints 22 and the couplings between the hounds and the gear casing are disposed in the same vertical planes so that the lateral movement of the hounds and of the inner ends of the said shafts will not disengage the pinions 4 from the gear wheels on the axles, but the axles will be positively driven whether they are in parallelism or at an angle to each other. The hangers 8, being pivotally connected with the supporting frame, fully accommodate the swinging movement of the parts in steering so that there will be no binding between the axle frames and the bolsters or between the bolsters and the supporting frame.

It will be readily noted that I have provided a power mechanism which is composed of few parts and is compactly arranged so that, while the power is applied directly to both axles and the steering is accomplished by shifting a portion of the gearing, the number of joints is not multiplied, and, consequently, the mechanism is not apt to get out of order.

Having thus described my invention, what I claim as new is:—

1. The combination of a pair of axles, axle frames providing bearings therefor, a supporting frame pivotally mounted upon the axle frames, a gear case pivotally suspended on the supporting frame, hounds secured rigidly to the axle frames and having a universal connection with the gear case, means for vibrating said gear case, and gearing within the gear case connected with the axles to rotate the same.

2. The combination of a pair of axles, axle frames providing bearings for the axles, a supporting frame pivotally mounted upon the axle frames, hounds extending from the axle frames, a vibratory member pivotally attached at its upper end to the frame and connected at its lower end to the inner ends of the hounds, and means for swinging said member laterally to effect steering.

3. The combination of a pair of axles, axle frames providing bearings therefor, a supporting frame pivotally mounted on the axle frames, hounds extending from the axle frames, a central tubular member suspended upon the supporting frame, means for vibrating said member transversely of the supporting frame, sleeves within the ends of said tubular member, rings on said sleeve pivoted to the ends of said tubular member, and other rings on the said sleeves pivoted to the inner ends of the hounds.

4. The combination of a pair of axles, a supporting frame pivotally connected therewith, a motor on the supporting frame, a driving shaft extending from said motor, a gear case pivotally hung on said shaft, a train of gearing within said gear case including a shaft projecting through the sides thereof at the lower end of the same, gearing between said shaft and the axles, connections between the gear case and the axles, and means for vibrating said gear case laterally.

5. The combination of a pair of axles, pinions on the axles, axle frames providing bearings for the axles and extending above and below the pinions, a set of hounds converging from the tops and bottoms of the axle frames, a pendulous gear casing between the inner ends of the sets of hounds, universal connections between the hounds and the lower end of said casing, a train of gearing within said casing, shafts supported by the hounds and having their outer ends geared to the pinions on the axles, and universal connections between the inner ends of said shafts and the train of gearing.

In testimony whereof I affix my signature in presence of two witnesses.

ALPHONS BOUAS. [L. S.]

Witnesses:
JOHN C. BOWER,
THOMAS P. ARMSTRONG.